United States Patent
D'Acunto et al.

(10) Patent No.: US 11,303,527 B2
(45) Date of Patent: Apr. 12, 2022

(54) NETWORK SLICE USAGE

(71) Applicants: Koninklijke KPN N.V., Rotterdam (NL); Nederlandse Organisatie Voor Toegepast-Natuurwetenschappelijk Onderzoek TNO, s'-Gravenhage (NL)

(72) Inventors: Lucia D'Acunto, Delft (NL); Pieter Nooren, Delft (NL); Toni Dimitrovski, The Hague (NL)

(73) Assignees: KONINKLIKE KPN N.V., Rotterdam (NL); NEDERLANDSK ORGANISATIE VOOR TOEGEPAST-NATUURWETEN SCHAPPELIJK ONDERZOEK TNO, 'S-Gravenhage (NL)

( * ) Notice: Subject to any disclaimer, the term of this patent is extended or adjusted under 35 U.S.C. 154(b) by 0 days.

(21) Appl. No.: 16/962,208

(22) PCT Filed: Jan. 18, 2019

(86) PCT No.: PCT/EP2019/051233
§ 371 (c)(1),
(2) Date: Jul. 14, 2020

(87) PCT Pub. No.: WO2019/141804
PCT Pub. Date: Jul. 25, 2019

(65) Prior Publication Data
US 2021/0058297 A1    Feb. 25, 2021

(30) Foreign Application Priority Data

Jan. 19, 2018 (EP) .................................... 18152499

(51) Int. Cl.
*H04L 12/24*    (2006.01)
*H04W 24/02*   (2009.01)
(Continued)

(52) U.S. Cl.
CPC ...... *H04L 41/0896* (2013.01); *H04L 41/5019* (2013.01); *H04W 24/02* (2013.01); *H04W 28/06* (2013.01)

(58) Field of Classification Search
CPC .......... H04L 41/5019; H04L 41/0896; H04W 24/02; H04W 48/18; H04W 28/06
See application file for complete search history.

(56) References Cited

U.S. PATENT DOCUMENTS 10,631,208 B2 * 4/2020 Dowlatkhah ......... H04W 28/16
2016/0353465 A1 * 12/2016 Vrzic ................ H04W 28/0247
(Continued)

FOREIGN PATENT DOCUMENTS

WO    WO2016/192636 A1    12/2016

OTHER PUBLICATIONS

3rd Generation Partnership Project, Technical Specification Group Services and System Aspects, "System Architecture for the 5G System, Stage 2 (Release 15)", TS 22.261, Sep. 2017, section 6.10.2.
(Continued)

*Primary Examiner* — Abdullahi E Salad
(74) *Attorney, Agent, or Firm* — Hamilton, Brook, Smith & Reynolds, P.C.

(57) ABSTRACT

A communication network may be provided having a plurality of network nodes and which may be configured to enable instantiation of different network slices which represent virtual networks with different feature sets, e.g., providing different network functions and/or having different network characteristics. The communication network may be configured to allow a network slice to be used for data communication between i) a user equipment (UE) connected to the network and configured to execute an application, and ii) a content or application server (CAS) configured to provide an application service via the network.
(Continued)

Network functions may be provided which allow influencing the UE's slice usage based on requirements of the application service, even if the CAS is located outside the connectivity provider's network, e.g., outside a mobile operator's domain.

10 Claims, 10 Drawing Sheets

(51) Int. Cl.
    *H04W 28/06*     (2009.01)
    *H04L 41/0896*     (2022.01)
    *H04L 41/5019*     (2022.01)

(56) References Cited

U.S. PATENT DOCUMENTS

| | | | | |
|---|---|---|---|---|
| 2017/0054595 | A1* | 2/2017 | Zhang | H04L 41/12 |
| 2017/0311304 | A1* | 10/2017 | Lu | H04N 21/4131 |
| 2018/0359337 | A1* | 12/2018 | Kodaypak | H04L 43/08 |
| 2019/0174498 | A1* | 6/2019 | Samdanis | H04W 16/10 |
| 2019/0357130 | A1* | 11/2019 | Garcia Azorero | H04W 48/18 |
| 2020/0154401 | A1* | 5/2020 | Maguire | H04L 41/145 |
| 2021/0084523 | A1* | 3/2021 | Kucera | H04L 41/0896 |

OTHER PUBLICATIONS

Choyi, V. K., *"Network slice selection, assignment and routing within 5G Networks"*, *2016 IEEE Conference on Standards for Communications and Networking (CSCN)*, Berlin. 2016, pp. 1-7.

$3^{rd}$ Generation Partnership Project, Technical Specification Group Services and System Aspects; Service requirements for the 5G System; Stage 1 (Release 16), vol. SA WG1, No. V16.2.0, Jan. 5, 2018, pp. 1-53.

International Search Report and Written Opinion for Int. Application No. PCT/EP2019/051233, titled, "Network Slice Usage" dated Mar. 28, 2019.

European Search Report for EP Application No. 18152499.2, titled, "Network Slice Usage" dated May 4, 2018.

\* cited by examiner

NETWORK SLICE USAGE

This application is the U.S. National Stage of International Application No. PCT/EP2019/051233, filed on Jan. 18, 2019, which designates the U.S., published in English, and claims priority under 35 U.S.C. § 119 or 365(c) to European Application No. 18152499.2, filed Jan. 19, 2018.

The entire teachings of the above applications are incorporated herein by reference.

FIELD OF THE INVENTION

The invention relates to a communication network which comprises a plurality of network nodes and which may be configured to enable instantiation of different network slices which represent virtual networks with different feature sets, e.g., providing different network functions and/or having different network characteristics.

The communication network may be configured to allow a network slice to be selected for data communication between i) a user equipment (UE) connected to the network and configured to execute an application, and ii) a content or application server (CAS) configured to provide an application service via the network.

The invention further relates to entities associated with the communication network, such as a network node or a distributed system of network nodes, to a method for use with the communication network, and to a computer program comprising instructions for causing a processor system to perform the method.

BACKGROUND ART

Next generation network architectures, such as 5G, may separate network functions from the underlying hardware resources, being in the case of a telecommunication network the network nodes of the network. For that purpose, so-called Network Virtualization (NV) techniques may be used, and in particular Network Function Virtualization (NFV) techniques which provide network functions that are instantiable in software using the hardware of one or more of the network nodes.

In the following, 'providing' or 'establishing' a network function may thus comprise or refer to the instantiation of the network function in the network.

Such next generation network architectures may further define virtual data planes which separate data traffic in the network. Such virtual data planes, which may be established by Software-Defined Network (SDN) but also by other techniques, may include a control plane to enable transmission of control data in the network, and a user plane to enable transmission of user data to and/or from User Equipment (UE) connected to the network. The user plane may also be referred to as 'data plane'.

A design target of such and similar next generation network architectures is to provide networks which may be 'tailored' to the requirements of the applications which use the network. Such tailoring may be obtained by instantiation of different network slices which represent virtual networks with different feature sets, e.g., providing different network functions and/or having different network characteristics.

A specific example is 5G network slicing, which allows for the creation of virtual network slices on top of the physical network fabric, with the network slices being tailorable towards requirements of specific applications and application categories. For example, the tailoring may be in terms of Quality of Service (QoS) (e.g., bandwidth, delay, jitter, etc.), network topology (e.g., Local Break Out) and/or in specific functions (e.g., local processing—caching, transcoding, synchronization, etc.). For example, in the case of video streaming, such specific functions in a network slice may include a local streaming server (to minimize latency and possibly increase bandwidth), a transcoder (to re-encode a video stream in a format suitable for the UE), an MPEG DANE (for QoS management), an ICE/STUN server (for NAT traversal), a stream synchronizer (e.g., a device that supports the UE in the synchronization of multiple audiovisual streams, e.g., for a videoconferencing application), and more. This tailoring of feature sets is expected to enable new services, e.g., where ultra-low latency is required, such as Virtual Reality (VR) and Augmented Reality (AR), and improve the performance of existing services, e.g., video streaming in a highly mobile environment.

3GPP [1] describes an architecture for a next generation mobile network which includes application functions (AF). These AFs may support applications executed by UE, e.g., by providing an application service via the network to the application, such as video streaming. A general architecture is shown in FIG. 1, where the AF would be instantiated as a control plane function operating in the Control Plane (CP) of the network. Since the 3GPP AF is in the mobile operator domain, a mobile operator may determine the optimal network slice for a combination of a specific AF and a specific UE, as it has knowledge on both entities and/or their requirements. For example, this may result in a Network Slice Selection Policy (NSSP) being provisioned to the UE which contains rules associating an application service with a network slice.

However, application services may also be provided from outside the mobile operator domain, as is done in so-called over-the-top services or internet-based services. In the example of FIG. 1, such application services may be provided from a Content or Application Server (CAS) comprised in or connected to the Data Network (DN) via the N6 interface. A problem that occurs in this situation is that the mobile operator may not have knowledge of the application service and therefore may be unable to determine and select a network slice that can effectively support the application, e.g., by providing the required QoS and specific network functions.

A user equipment may thus be provided with a NSSP which does not contain a rule associating an 'outside' application service to a network slice, or in general, the UE may be provided with a slice usage rule which may have been generated without taking into account the requirements of the application service.

In recognition of such problems, 3GPP [1] currently states that "Based on operator policy, the 5G network shall provide suitable APIs to allow a trusted $3^{rd}$ party to configure the information which associates a service to a network slice used for the $3^{rd}$ party". However, 3GPP currently does not define a mechanism to achieve this.

A mechanism proposed by [2] attempts to use application requirements to select slices. However, this mechanism does not allow influencing the network slice usage by a UE from outside the mobile network domain. In addition, this mechanism does not allow influencing the network slice usage in real-time, which may be needed for alignment with the dynamics in application development by 3rd parties.

REFERENCES

[1] 3rd Generation Partnership Project, Technical Specification Group Services and System Aspects, "System Architecture for the 5G System, Stage 2 (Release 15)", TS 22.261, 2017-09, section 6.10.2.

[2] V. K. Choyi, A. Abdel-Hamid, Y. Shah, S. Ferdi and A. Brusilovsky, "Network slice selection, assignment and routing within 5G Networks", 2016 IEEE Conference on Standards for Communications and Networking (CSCN), Berlin, 2016, pp. 1-7. doi: 10.1109/CSCN.2016.7784887

SUMMARY OF THE INVENTION

It would be desirable to influence the user equipment's (UE) slice usage based on requirements of an application service provided by a content or application server (CAS), even if the content or application server is located in an outside domain, and thereby outside of the control, of a connectivity provider providing connectivity to the user equipment. For example, the user equipment may be connected to a 5G mobile communication network whereas the CAS may be comprised in a data network connected to the mobile communication network, e.g., the Internet.

The network of such a connectivity provider is in the following also simply referred to as 'connectivity provider's network', whereas the overall communication network providing the end-to-end communication between the UE and the CAS is henceforth simply referred to as 'communication network' and may thus include the connectivity provider's network as well as other (data) networks.

To this end, new network functions may be provided in the communication network network, which may include a slice usage function (SUF) which may be configured to assist in the creation of a slice usage rule for data communication between the UE and the CAS, and a network feature usage assistance function (NFUAF) which may be configured to identify a feature set based on the requirements of the application service. One or more network slices may provide the desired feature set. The slice usage rule may thus be generated and provided to the UE to enable the UE to use the most appropriate network slice(s) in its communication with the CAS.

The SUF may in some embodiments be implemented as a control plane function in the core of the connectivity provider's network. The NFUAF may in some embodiments be implemented by the CAS and may be controllable by an operator of the CAS, being for example a third party other than the connectivity provider. This may allow the third party to influence the slice usage of the UE.

The interaction between the SUF and NFUAF may take various forms. For example, the NFUAF may provide a feature set identifier to the SUF, which may generate a slice identifier identifying a network slice providing said feature set. The SUF may then provide the slice identifier to the PCF which may provide the slice identifier as part of a NSSP to the UE. In other embodiments, the slice usage rule may be provided by the NFUAF to the UE via the data plane, the NAS transport mechanism or another communication network. In other embodiments, both the SUF and the NFUAF may be implemented by a Network Exposure Function (NEF) of the connectivity provider's network.

In accordance with a first aspect of the invention, a communication network may be provided which may comprise a plurality of network nodes and may be configured to enable instantiation of different network slices which represent virtual networks with different feature sets. The network may comprise:

a slice usage function (SUF) configured to assist in the creation of a slice usage rule for data communication between i) a user equipment (UE) connected to the network and configured to execute an application, and ii) a content or application server (CAS) configured to provide an application service via the network, by:
  obtaining an identifier of the user equipment (UE),
  generating feature set data identifying a feature set for every network slice which is available to the user equipment (UE) based on the identifier of the user equipment and subscription data of the user equipment;

a network feature usage assistance function (NFUAF) configured to:
  obtain the feature set data,
  based on the feature set data and requirements of the application service, select at least one of the feature sets, and
  determining a feature set identifier identifying said selected feature set, wherein the feature set identifier enables a network slice to be identified which is associated with the selected feature set;

wherein a slice usage rule may be provided to the user equipment to enable the user equipment to use said network slice for the application service.

In accordance with a further aspect of the invention, a network node or a distributed system of network nodes may be configured as the slice usage function (SUF) of the communication network, and may comprise:

a network interface to the network;
a processor system configured to assist in the creation of a slice usage rule for data communication between i) a user equipment (UE) connected to the network and configured to execute an application, and ii) a content or application server (CAS) configured to provide an application service via the network, by:
  obtaining an identifier of the user equipment (UE), and
  generating feature set data identifying a feature set for every network slice which is available to the user equipment (UE) based on the identifier of the user equipment and subscription data of the user equipment.

In accordance with a further aspect of the invention, a network node or a distributed system of network nodes may be configured as the content or application server (CAS). The content or application server may be configured to provide an application service via the network to a user equipment (UE) which is connected to the network and configured to execute an application. The content or application server may comprise:

a network interface to the network;
a processor system configured to implement a network feature usage assistance function (NFUAF) which configures the processor system to:
  obtain feature set data identifying a feature set for every network slice which is available to the user equipment (UE),
  based on the feature set data and requirements of the application service, select at least one of the feature sets, and
  determine a feature set identifier identifying said selected feature set, wherein the feature set identifier is generated so as to enable a network slice to be identified which is associated with the selected feature set;

wherein a slice usage rule is provided to the user equipment to enable the user equipment to use said network slice for the application service.

In accordance with a further aspect of the invention, a device may be configured as the user equipment (UE). The device may comprise:
  a network interface to the network;
  a processor system configured to execute an application which uses an application service provided by a content or application server (CAS) connected to the network, wherein the processor system is configured to implement a policy handling function (PHF) which configures the processor system to, via the network interface:
    receive a slice usage rule identifying a network slice;
    parse the slice usage rule to identify the network slice to be used in the communication with the content or application server (CAS);
    establish a data communication (PDU) session to the content or application server (CAS) via said network slice.

In accordance with a further aspect of the invention, a method may be provided for use with a communication network which may comprise a plurality of network nodes and may be configured to enable instantiation of different network slices which represent virtual networks with different feature sets.

The method may assist in the creation of a slice usage rule for data communication between i) a user equipment (UE) connected to the network and configured to execute an application, and ii) a content or application server (CAS) configured to provide an application service via the network, by:
  obtaining an identifier of the user equipment (UE);
  generating feature set data identifying a feature set for every network slice which is available to the user equipment (UE) based on the identifier of the user equipment and subscription data of the user equipment;
  based on the feature set data and requirements of the application service, selecting at least one of the feature sets;
  determining a slice identifier identifying a network slice which is associated with the selected feature set; and
  based on the slice identifier, providing a slice usage rule to the user equipment to enable the user equipment to use said network slice for the application service.

In accordance with a further aspect of the invention, a transitory or non-transitory computer-readable medium may be provided comprising a computer program. The computer program may comprise instructions for causing a processor system to perform the method.

The above measures may be based on the consideration that it may be desirable to combine a) the over-the-top/internet-based approach, where an application on the UE interacts transparently to the connectivity provider's network with third party application functions outside the connectivity provider's network, e.g., outside the mobile operator domain, with b) the 3GPP/5G approach, where the UE interacts with the connectivity provider's network to set up desired connectivity for applications.

Accordingly, a SUF may be provided in the communication network, which may assist in the creation of a slice usage rule for data communication between the UE and the CAS and which may in some embodiments be provided in the core network, e.g., as a control plane function of the connectivity provider's network. In addition, a NFUAF may be provided, which in some embodiments may be part of a CAS outside the connectivity provider's network and which may allow a third-party service provider to, on the basis of the NFUAF interacting with the SUF, influence the network slice usage of the UE for its communication with the CAS itself. Such interaction may be based on the SUF offering an Application Programming Interface (API) and the NFUAF making use of the API. As such, the third-party service provider may influence the usage of networks slices for its application, which may allow the third party to provide an end user with a better or optimal experience, as the third party typically has the best knowledge on the requirements of the application.

A schematic and conceptual overview of an example in accordance with the above is shown in FIG. 2, where the CAS is shown to be connected to the connectivity provider's network of the UE via the Data Network (DN). During registration (not shown) to the connectivity provider's network, an UE may be provided with an option to use several network slices based on its subscription and may be provisioned with an NSSP that describes which network slice is to be used for which type of traffic. In a first step titled 'Access CAS', the UE may contact the CAS to request the application and/or content through a selected network slice specified by the NSSP. In a second step titled 'Service/Slice information', the CAS may inform the connectivity provider's network, and in particular the SUF (not shown explicitly in FIG. 2), of the application's requirements, e.g., via an API provided by the SUF. The connectivity provider's network may use this information to determine the optimal network slice for the application and the particular UE involved. In a third step titled 'Policy change', the connectivity provider's network may update the NSSP if a better slice exists and is different from the one used for the initial contact between UE and CAS. In a fourth step titled 'CAS traffic', application and/or content may be delivered through this slice.

An advantage of the above measures is that they may allow a third-party service provider to, in real-time, influence the slice usage of an UE based on the application service provided to the UE. This may provide better or optimal QoS and/or Quality of Experience (QoE) to the end user. Without such measures, the slice usage may be limited to standard or default slices or operator policy decisions that may provide a suboptimal slice selection, thereby resulting in a poorer QoS and/or QoE.

In the above and following, any reference to the requirements of the application executed by the UE and the requirements of the application service provided by the CAS are both to be understood as referring to the requirements in regards of the network, e.g., in terms of QoS or required network features.

The term 'slice usage rule' may refer to data which identifies a network slice and which explicitly, or at least implicitly by the context in which the data is provided, provides an indication of a usage of the network slice, which may be an intended usage associated with an application (service). Accordingly, such data may identify the application (service), or allow the application (service) to be identified, e.g., by comprising a key which is representative of the application (service), or be indirectly associated with the application by being provided to the UE when a particular application is executed. A non-limiting example of a slice usage rule is (an update to) the NSSP. Another example is an S-NSSAI, being a form of a slice identifier, when provided to the Policy Handling Function (PHF) of the UE when the UE executes a particular application. In general, a slice usage rule may be considered a slice selection suggestion.

Any function names such as SUF, NFUAF and PHF are descriptive names but do not imply limitations other than those claimed and/or described.

In an embodiment,
the network feature usage assistance function (NFUAF) may be configured to provide the feature set identifier to the slice usage function (SUF), and
the slice usage function (SUF) may be configured to, based on the feature set identifier, determine a slice identifier identifying the network slice which is associated with the selected feature set.

In accordance with this embodiment, the NFUAF may provide the feature set identifier to the SUF and the SUF may determine the slice identifier identifying the network slice which is associated with the selected feature set. The SUF may directly provide the slice identifier to the UE. Alternatively, in a further embodiment,
the network further may comprise a policy control function (PCF) configured to perform policy control for quality of service (QoS) in the network; and
the slice usage function (SUF) may be configured to:
provide the slice identifier to the policy control function (PCF);
request the policy control function (PCF) to provide the slice usage rule in the form of a network slice selection policy (NSSP) or in the form an update of the network slice selection policy to the user equipment (UE), wherein the slice usage rule contains an identifier of the network slice to be used by the application.

In accordance with this further embodiment, the slice usage may be influenced on the basis of the SUF requesting the PCF to make the identified slice available for selection to the UE, e.g., by providing an (update to the) NSSP to the UE.

In this respect, it is noted that by introducing a PHF in the UE, the UE may react to small changes in the NSSP without a need to receive a complete NSSP in each signaling exchange with the network or third parties. This may improve the efficiency of signaling as a smaller amount of data needs to be transferred. In the case of updates with the involvement of the PCF and/or AMF, this may be especially relevant as the messages are transferred via the control plane and their size is usually a constraint. Even in the case of updates without the involvement of the PCF or AMF, e.g., as described in following embodiments, this may allow for each application to have a choice in the network features without interfering in other applications choices.

In an embodiment, the network feature usage assistance function (NFUAF) may be configured to generate the feature set identifier in the form of a slice identifier identifying the network slice. Rather than (only) determining a feature set identifier which allows the NFUAF, the SUF or another entity to determine the corresponding slice identifier, the NFUAF may also directly determine the slice identifier and provide the slice identifier to the SUF. In an alternative embodiment, the network feature usage assistance function (NFUAF) may be configured to directly provide a slice usage rule to the user equipment (UE), for example in the form of the aforementioned slice identifier.

In an embodiment,
the network feature usage assistance function (NFUAF) may be implemented by the content or application server (CAS); and
the content or application server (CAS) may be configured to provide the slice identifier to the user equipment (UE) via:
a user plane (UP) of the communication network;
a further network such as the Internet; or
a non-access stratum (NAS) transport mechanism In accordance with this embodiment, the NFUAF may be implemented by the CAS, which itself may in some embodiments be located outside of the connectivity provider's network and which may communicate with the UE via one of the above-identified ways. If a separate communication path is used, such as the Internet, it may not be needed for a data session to already have been established between the UE and the CAS via the communication network. In general, it may be useful for the NFUAF to directly provide the slice usage rule to the UE if there is no need to store slice routing information in the network (as may done by having the NSSP in the PCF), in which case the PCF and/or the AMF in the communication network do not need to become involved, thus saving control plane resources in the communication network. It may also be useful when policy control is not enforced for the particular PDU session, in which case a PCF is not involved in the control of that particular session.

In an embodiment, the slice identifier may be determined in the form of a single network slice selection assistance information (S-NSSAI).

In an embodiment, the network may further comprise a network exposure function (NEF), and at least one of the slice usage function (SUF) and network feature usage assistance function (NFUAF) may be implemented by the NEF.

In an embodiment, the communication network may be a telecommunication network. In an embodiment, the communication network may comprise a core network, e.g., of a connectivity provider's network. In an embodiment, the connectivity provider's network may be a network adhering to one or more 3GPP standards.

It will be appreciated by those skilled in the art that two or more of the above-mentioned embodiments, implementations, and/or aspects of the invention may be combined in any way deemed useful.

Modifications and variations of any one of the processor systems, network nodes, the method and/or the computer programs, which correspond to the described modifications and variations of the communication network, and vice versa, may be carried out by a person skilled in the art on the basis of the present description.

BRIEF DESCRIPTION OF THE DRAWINGS

These and other aspects of the invention are apparent from and will be elucidated with reference to the embodiments described hereinafter. In the drawings.

FIG. 4-6 each show message exchanges which may follow the message exchange of either FIG. 3A or 3B and by which the slice selection is communicated to the user equipment via different mechanisms, being for:

FIG. 4 via the SUF and PCF, for FIG. 5 via a previously established user plane path between UE and CAS, and for FIG. 6 via the NAS transport mechanism;

Figure 1:
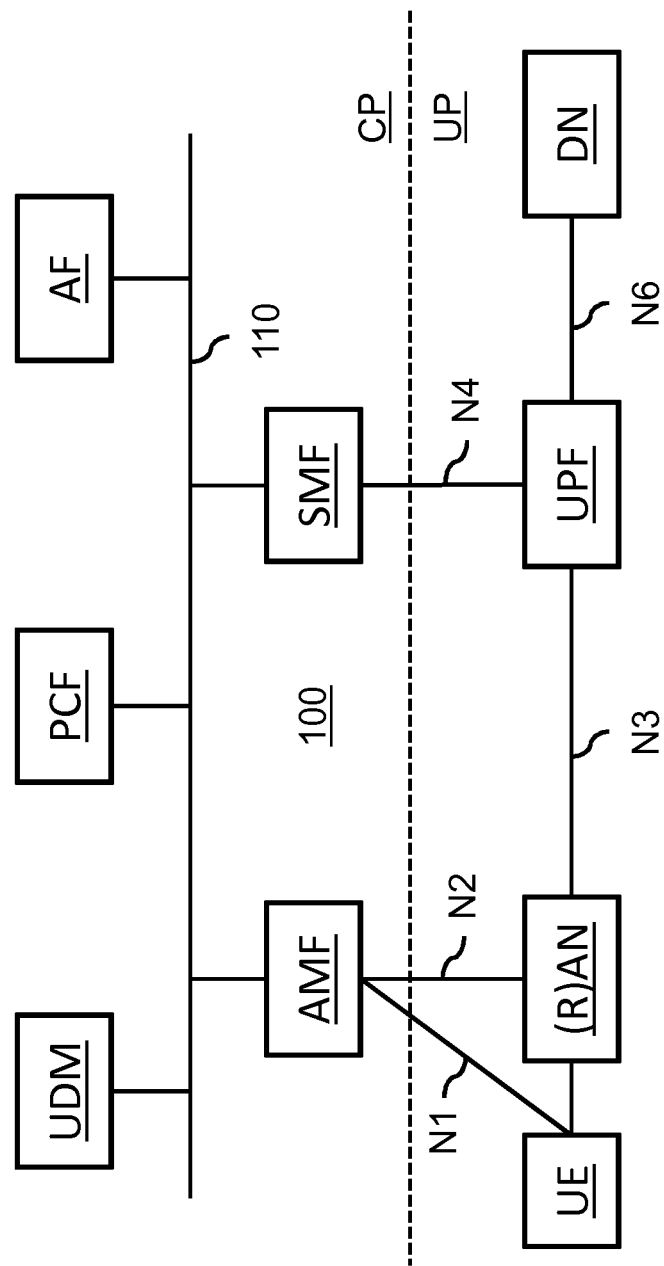
FIG. 1 shows a prior art 3GPP telecommunication network which comprises a control plane (CP) and a user plane (UP) and various 3GPP network functions.

It should be noted that items which have the same reference numbers in different figures, have the same structural features and the same functions, or are the same signals. Where the function and/or structure of such an item has been explained, there is no necessity for repeated explanation thereof in the detailed description.

LIST OF REFERENCE AND ABBREVIATIONS

The following list of references and abbreviations is provided for facilitating the interpretation of the drawings and shall not be construed as limiting the claims.

N1-N6 interfaces
AMF access and mobility management function
CP control plane
DN data network
NEF network exposure function
NFUAF network feature usage assistance function
NSMF network slicing management and orchestration
PCF policy function
PDU protocol data unit
PHF policy handling function
(R)AN (radio) access network
SMF session management function
SUF slice usage function
UDM unified data management.
UE user equipment
UP user plane
UPF user plane function
100 connectivity provider's network
110 service bus
200 system representing network node or user equipment
210 network interface
220 processor
230 storage
300 computer readable medium
310 non-transitory data
1000 exemplary data processing system
1002 processor
1004 memory element
1006 system bus
1008 local memory
1010 bulk storage device
1012 input device
1014 output device
1016 network adapter
1018 application

DETAILED DESCRIPTION OF EMBODIMENTS

The following embodiments are described in the context of a telecommunication network adhering to one or more 5G 3GPP standards, such as [1] which is hereby incorporated by reference at least in as far as pertaining to its architecture and network functions. In these embodiments, network functions as claimed other than the SUF, NFUAF and PHF may be further explained in accordance with the following glossary. This glossary, however, is not meant to limit the interpretation of the claims. Namely, the concepts described in the following embodiments may equally apply, mutatis mutandis, to any other type of communication network having separate user and control planes and network functions capable of performing the functions as defined by the wording of the claims.

Glossary of Terms

AMF—Access and Mobility Management Function: may provide UE-based authentication, authorization, and mobility management. The AMF may be the first element that a UE connects to when it wishes to use a 5G network.

DN—Data Network: may represent a network outside of the 5G network. This may still be inside the operator's network, or may be outside, facing the Internet.

NEF—Network Exposure Function: may expose the network functions and capabilities of the 5G network to 3rd parties, e.g., not affiliated with the operator.

PCF—Policy Function: may be responsible for policy control in order to enable Quality of Service (QoS) management.

PDU—Protocol Data Unit: this term may refer to a packet or frame exchanged between a UE and an entity in the Data Network.

PDU Session: an association between the UE and a Data Network (DN) that provides a PDU connectivity service. The type of association may be IP, Ethernet or unstructured. Via a PDU session the UE may exchange data with the particular DN.

(R)AN—(Radio) Access Network: part of the network that connects the UE with the core 5G network (e.g., AMF, PCF, NEF, SMF, UPF may be in the core).

SMF—Session Management Function: may be responsible for session management and may allocate IP addresses to UEs; may also select and control the UPFs for data transfer; the SMF may be seen as an SDN network controller.

UE—User Equipment: may represent an end-user device (e.g. mobile phone, tablet, smart watch, VR headset, TV, set-top box, laptop, etc.).

UPF—User Plane Function: may route the PDU sessions of UEs across the 5G network; it may be seen as a network router or switch or forwarder.

Prior Art Network

FIG. 1 shows a prior art telecommunication network 100 as described by [1] which may represent a connectivity provider's network, and in which an application function (AF) is provided as a control plane function operating in the control plane CP of the network. It can be seen that the AF is connected to a service bus 110 in the control plane CP. FIG. 1 further illustrates the user plane UP, and interfaces N1, N2 and N4 which may be used by the control plane to setup data-paths in the user plane. In addition, a N6 interface is shown to an (external) data network DN.

Conceptual Overview

Figure 2:
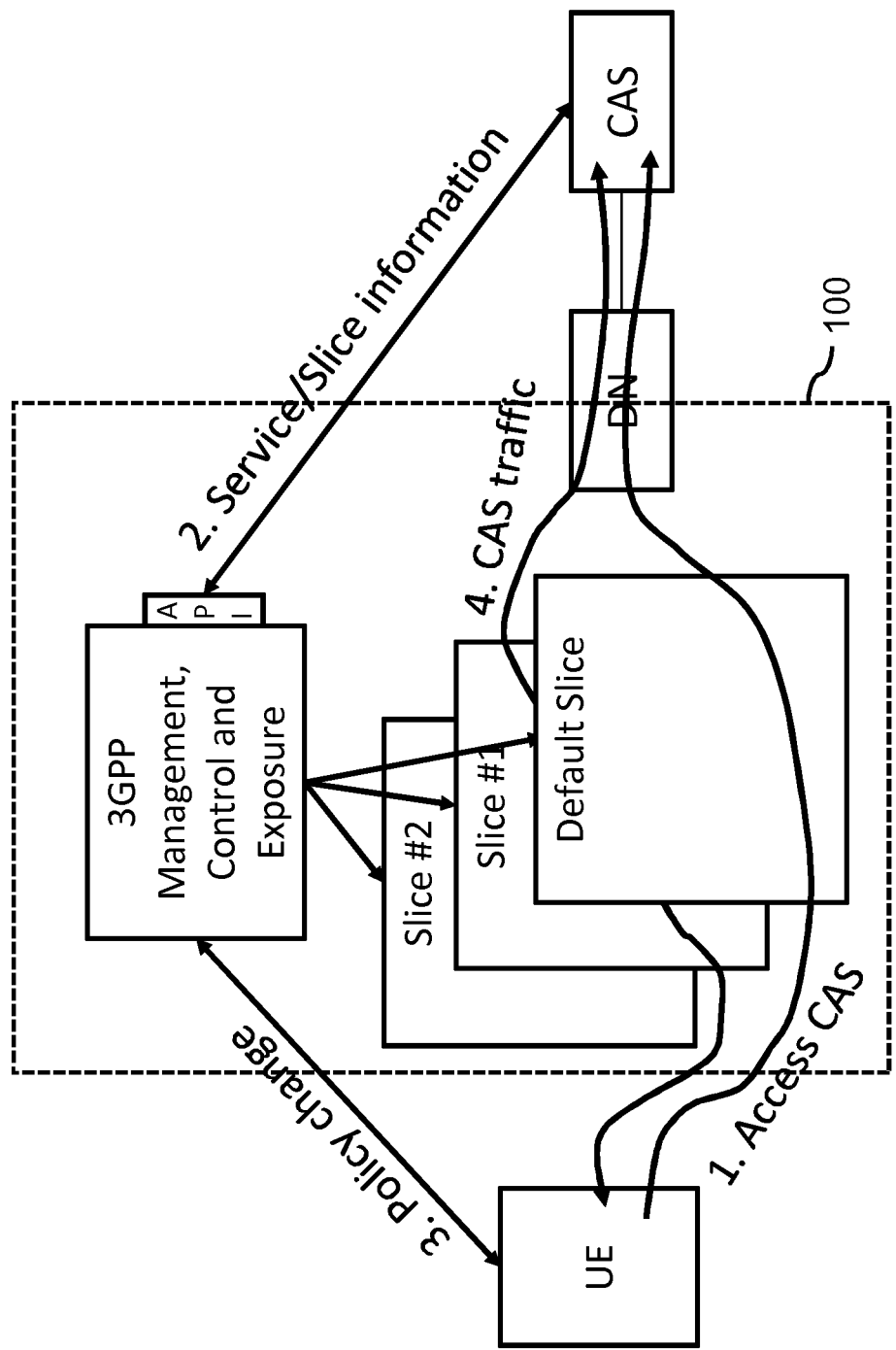
FIG. 2 shows a schematic and conceptual overview of an embodiment in which the CAS exchanges service/slice information with the communication network via an API, which effects a policy change which is communicated to the UE.

FIG. 2 provides a schematic and conceptual overview of an embodiment, where the CAS is shown to be connected to the connectivity provider's network 100 of the UE via the Data Network (DN). During registration (not shown) to the connectivity provider's network, an UE may be provided with an option to use several network slices based on its subscription and may be provisioned with an NSSP that describes which network slice is to be used for which type of traffic. In a first step titled 'Access CAS', the UE may contact the CAS to request the application and/or content through a selected network slice specified by the NSSP. In a second step titled 'Service/Slice information', the CAS may inform the connectivity provider's network, and in particular the SUF (not shown explicitly in FIG. 2), of the application's requirements, e.g., via an API provided by the SUF. The connectivity provider's network may use this information to determine the optimal network slice for the application and the particular UE involved. In a third step titled 'Policy change', the connectivity provider's network may update the NSSP if a better slice exists and is different from the one used for the initial contact between UE and CAS. In a fourth step titled 'CAS traffic', application and/or content may be delivered through this slice.

Detailed Embodiments

FIGS. 3A-7 each show message exchanges relating to detailed embodiments, in which it is assumed that the UE has already registered with the connectivity provider's network and has established at least one PDU session via which it can send a request to the CAS. The CAS may be any entity that has some content or application service that the UE may need. For example, the CAS may provide audio/video content, a communication service or a processing element that supports the application running on or executed by the UE.

Figure 3A:
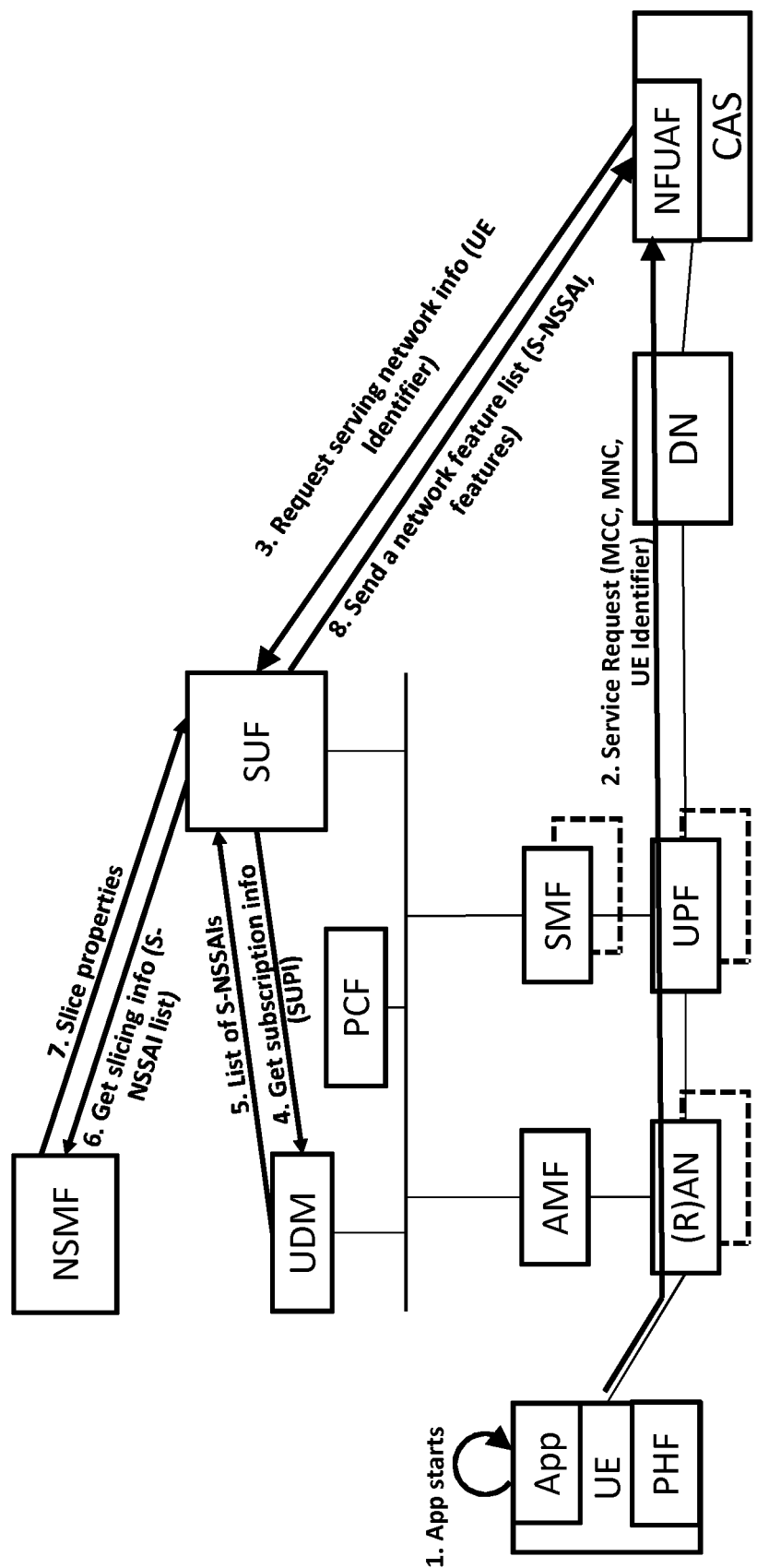
FIG. 3A shows a message exchange by which the SUF provides feature set data to the NFUAF and the NFUAF selects a feature set identifying a network slice on the basis of the feature set data provided by the SUF.

FIG. 3A shows a message exchange by which the SUF may provide feature set data to the NFUAF and the NFUAF may select a feature set identifying a network slice on the basis of the feature set data provided by the SUF. The message exchange may be as follows (with the numbering matching FIG. 3A):

1. 'App starts': An application (in short also referred to as 'App') may start on UE, for example, because an end user has activated the App.

2. 'Service Request (MCC, MNC, UE Identifier)': The App may send a service request to the CAS for content or an application service. The service request may include a network identifier and an UE identifier. The network identifier may, for example, be an Mobile Country Code (MCC) and/or Mobile Network Code (MNC). The UE identifier may be a permanent identifier such as an International Mobile Subscriber Identity (IMSI), Subscription Permanent Identifier (SUR), MSISDN, or a temporary identifier such as an application-specific identifier, an IP address, or any similar type of identifier based on which the SUF can uniquely identify the UE in the network.

3. 'Request serving network info (UE Identifier)': Based on the network identifier(s) and UE identifier(s), the NFUAF in the CAS may request information on the set of network features available to the UE and their characteristics, e.g., in terms of QoS, specific functions, etc. The request may, but does not need to, use an API exposed by the SUF. Although shown in FIG. 3A and others as a separate function, the SUF may be part of existing 3GPP-defined functions such as the Network Exposure Function (NEF) or the Application Function (AF) in the connectivity provider's network. The message may also contain an application specific identifier or a CAS identifier.

4. 'Get subscription info (SUPI)': The SUF may compile a list of network slices that are available to the UE based on the UE's subscription data, namely by sending a request to the UDM which includes the UE's identifier(s), e.g., the SUPI.

5. 'List of S-NSSAIs': The UDM may respond with a list of network slices that the UE is subscribed to or allowed to use, with each network slice being identified by a S-NSSAI.

6. 'Get slicing info (S-NSSAI list)': The SUF may determine the feature sets associated with the available network slices. For this purpose, the SUF may be configured to dynamically determine this information, for example by requesting this information by the depicted message from the Network Slice Management Function (NSMF) as defined by 3GPP TS28.530. Alternatively, the SUF may be pre-configured with information on the available network slices and their feature sets and/or the NSMF's functionality may be implemented by the SUF, in which case no explicit message may need to be sent and the following step 7 may be skipped. Alternatively, the SUF may be configured to immediately return a slice identifier based on the third party's identity, e.g., as indicated by the aforementioned application-specific identifier.

7. 'Slice properties': The NSMF may compile the list of feature sets provided by the slices indicated by the SUF and send this information to the SUF.

8. 'Send a network feature list (S-NSSAI, features)': The SUF may send feature set data to the CAS which may identify sets of network features which are available from different network slices, for example in the following form:

| Feature set identifier (optionally an S-NSSAI) | Network Features |
| --- | --- |
| A | QoS = video, content caching, local content processing |
| B | QoS = voice, transcoding |
| C | QoS = best effort |

The key information (first column) to each feature set may be representative of one or more S-NSSAI's and not necessarily be the S-NSSAI value itself.

Figure 3B:
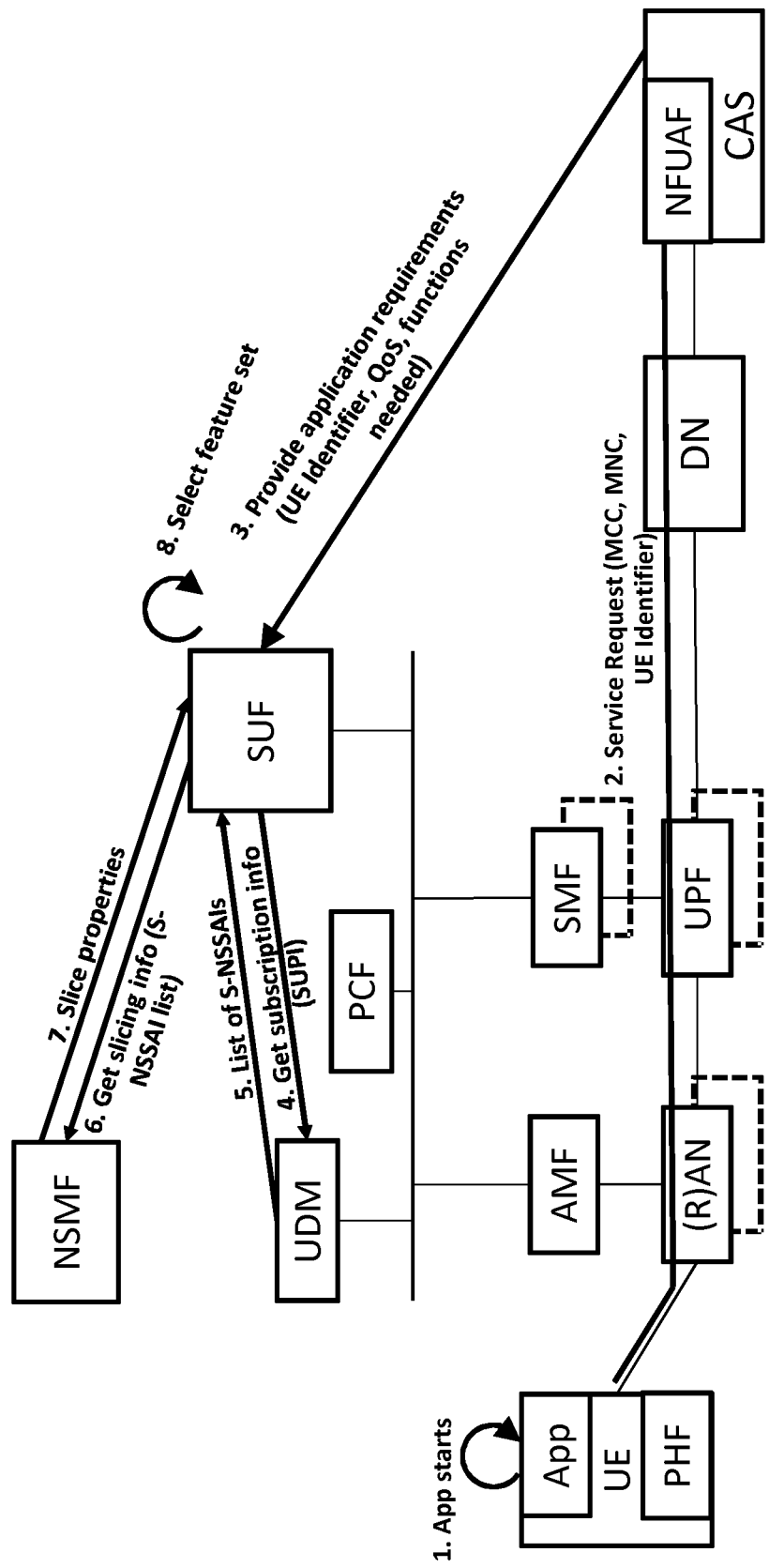
FIG. 3B shows an alternative message exchange to the message exchange of FIG. 3A, by which the NFUAF provides data representing application requirements to the SUF and by which the SUF selects the feature set identifying the network slice on the basis of the application requirements provided by the NFUAF.

FIG. 3B shows an alternative message exchange in which the SUF may select a feature set based on application requirements provided by the NFUAF, rather than the NFUAF itself selecting the feature set. In this embodiment, steps 1, 2 and 4-7 correspond to those described with reference to FIG. 3A.

The message exchange may otherwise comprise:

3. 'Provide application requirements (UE Identifier, QoS, functions needed)': Based on the UE identifier and optionally the network identifier, the NFUAF may provide application requirements to the SUF, which may be specified in various ways, e.g., in terms of QoS requirements (bandwidth, delay, packet loss, jitter, reliability, etc.), needed functions (caching, transcoding, synchronization, etc.).

8. 'Select feature set': The SUF may combine the information it has collected on the available network slices and their feature sets with the application requirements to select the optimal slice(s) for the particular application and UE.

Figure 4:
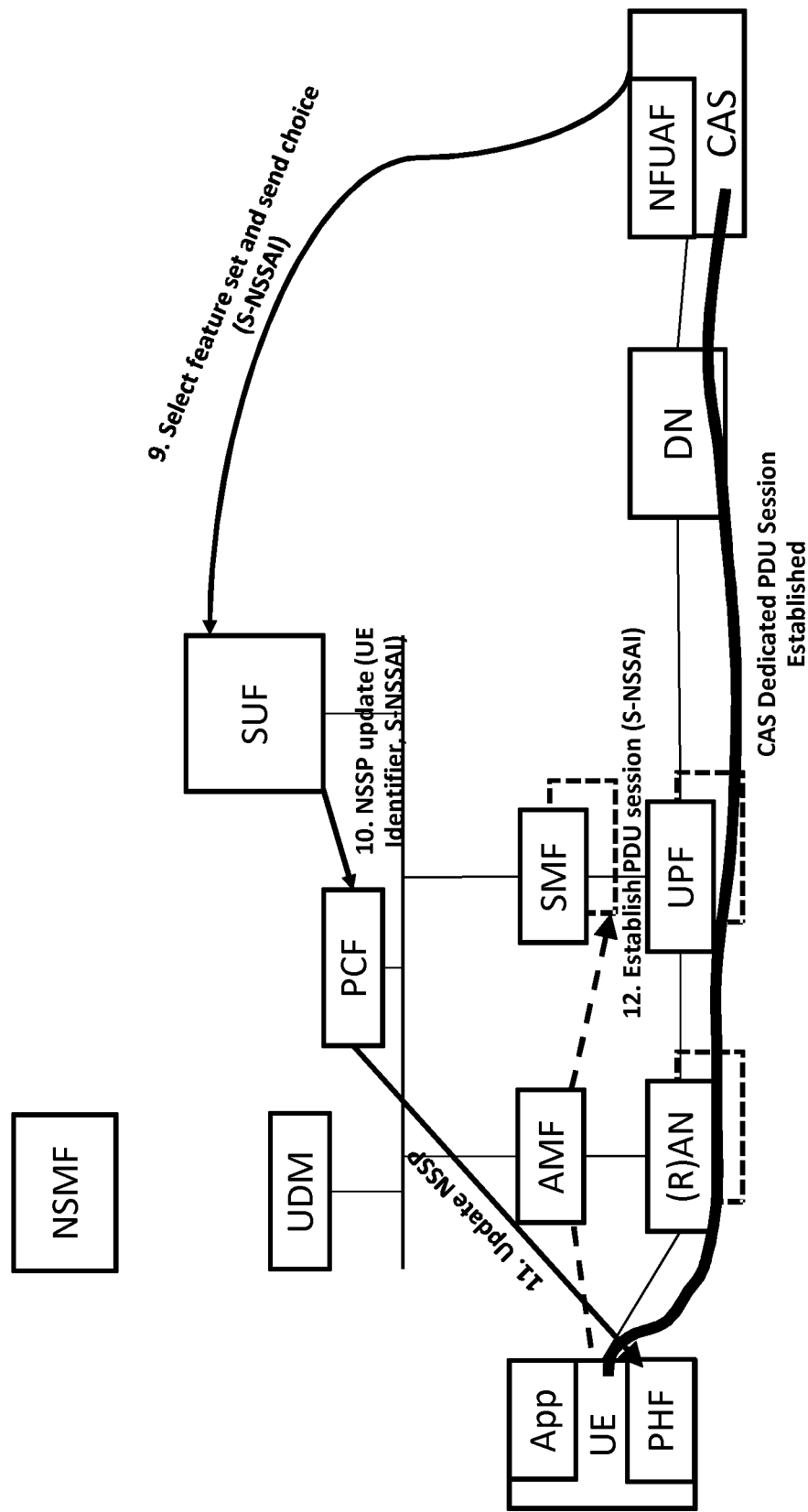
Figure 5:
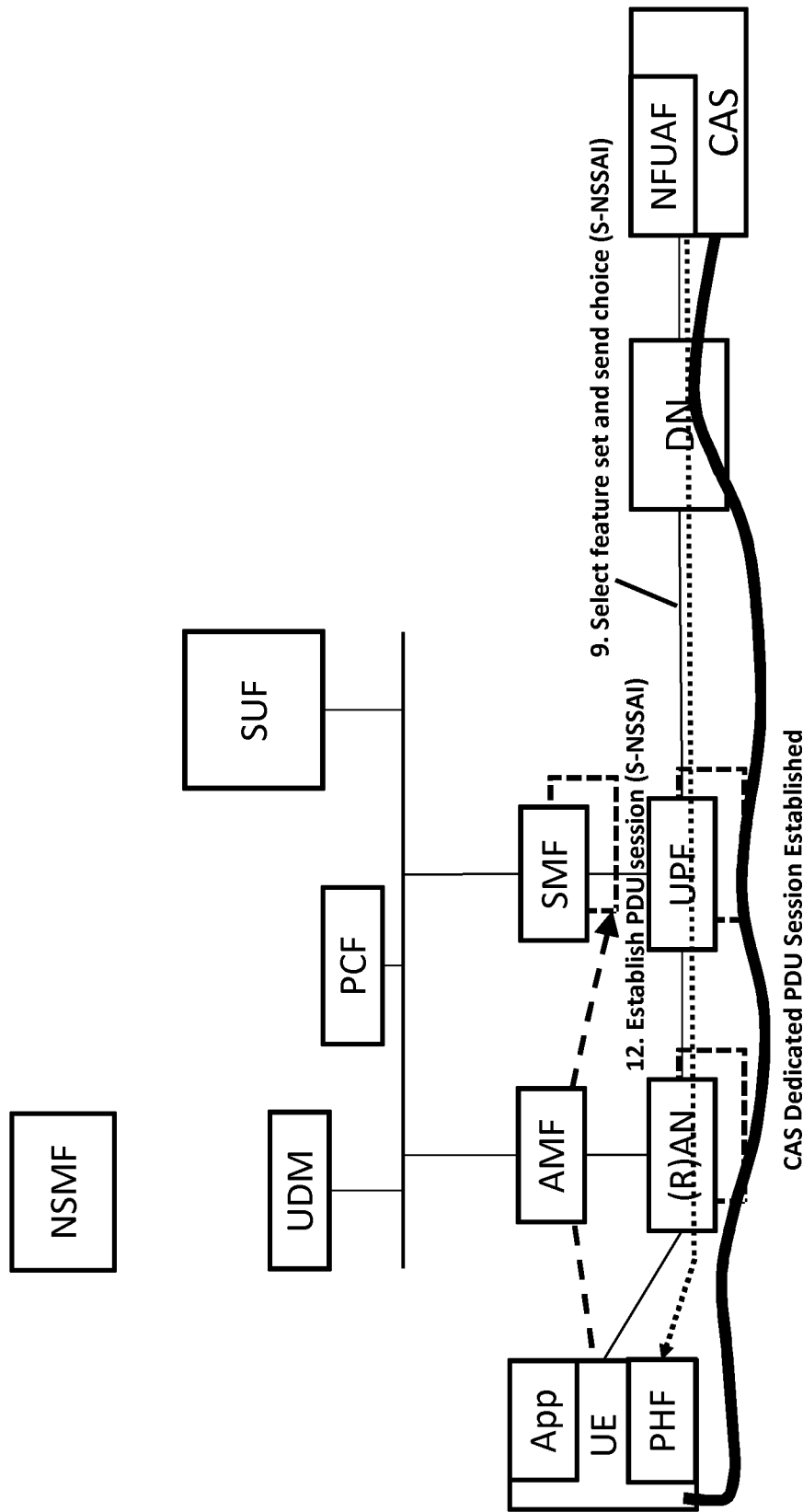
Figure 6:
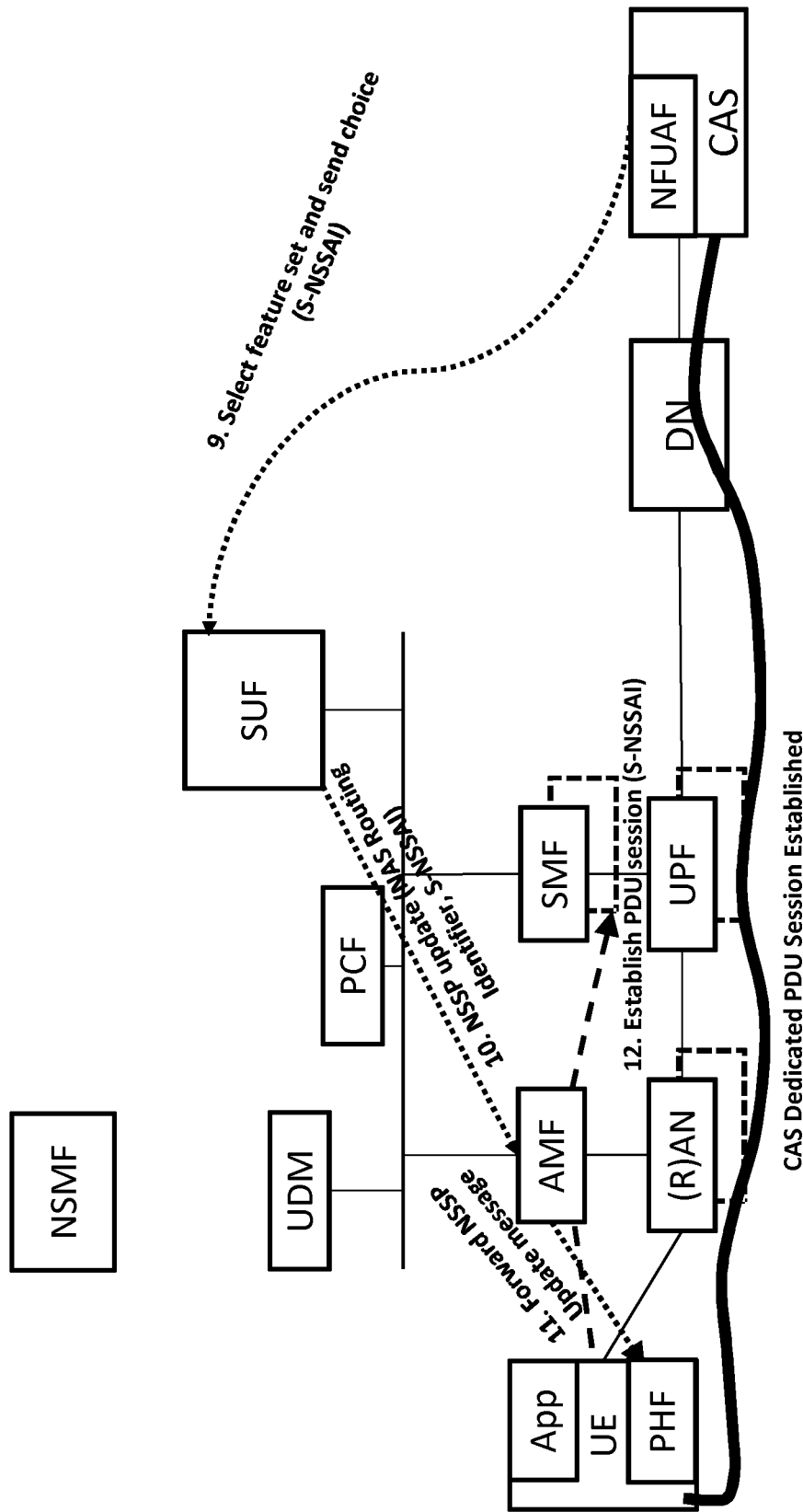

FIG. 4-6 each show message exchanges which may follow the message exchange of either FIG. 3A or 3B and by which the slice selection may be communicated to the user equipment via different mechanisms.

FIG. 4 shows a message exchange by which the slice selection may be communicated to the UE via the SUF and PCF. The message exchange may be as follows (with the numbering matching FIG. 4):

9. 'Select feature set and send choice (S-NSSAI)': Based on the feature set data, the NFUAF may select a set of features which may be needed by the application (service) and send the associated key back to the SUF. Whether this key is the S-NSSAI itself, or merely a key representative of the S-NSSAI, may depend on the previously received information from the SUF. Optionally, the NFUAF may also send a list of IP addresses or traffic identifiers that belong to the CAS.

10. 'NSSP update (UE Identifier, S-NSSAI)': The SUF may send a request to the PCF to include the S-NSSAI belonging to the identified feature set, e.g., the key provided by the NFUAF, in the NSSP and to send an update to the UE.

11. 'Update NSSP': The PCF may update the NSSP and send the updated NSSP to the UE. The PCF may send the complete NSSP or an update to the NSSP to account for the changes. The Policy Handling Function (PHF) in the UE may process this policy update and may perform the necessary changes so that all traffic destined to the CAS passes via the particular network slice identified by the S-NSSAI.

12. 'Establish PDU session (S-NSSAI)': A new PDU Session may be established via the particular slice identified by the S-NSSAI for use with all subsequent traffic to the CAS. It may also be possible that a PDU Session in the particular network slice already exists, in which case this existing PDU Session may be used instead of the UE having to establish new PDU session with the CAS.

FIG. 5 shows a message exchange by which the slice selection may be communicated to the UE via a previously established user plane path between UE and CAS. The message exchange may be as follows (with the numbering matching FIG. 5):

9. 'Select feature set and send choice (S-NSSAI)': The NFUAF may select a desired set of features and send the corresponding S-NSSAI to the UE via the user plane, for example through the same slice and connectivity used by the UE in step 2.

(step 10-11 may be skipped)

12. 'Establish PDU session (S-NSSAI)': same as described for FIG. 4.

Alternatively, since it is common for UEs to have access to the Internet via multiple access networks, step 9 may be executed using yet another connectivity path between the UE and the CAS, such as for example Wi-Fi.

Figure 8:
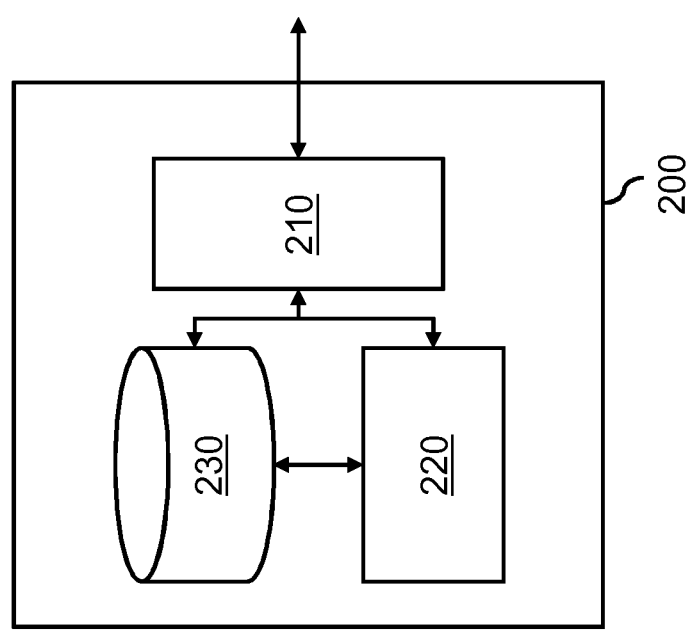
FIG. 8 shows a system which may represent a network node implementing the SUF and/or the NFUAF, or a user equipment implementing the PHF.

FIG. 6 shows a message exchange by which the slice selection may be communicated via the NAS transport mechanism in the control plane, as described in TS23.501 (FIG. 8.2.2.1-1, "other"). The message exchange may be as follows (with the numbering matching FIG. 6):

9. 'Select feature set and send choice (S-NSSAI)': The NFUAF may select a desired set of features and send a key representative of said selection back to the SUF via the NAS transport mechanism from TS23.501. Whether this key is the S-NSSAI itself, or merely a key representative of the S-NSSAI, may depend on the previously received information from the SUF. Optionally, the NFUAF may also send a list of IP addresses or traffic identifiers that belong to the CAS.

10. 'NSSP update (NAS Routing Identifier, S-NSSAI)': The SUF may send the S-NSSAI to the AMF via the NAS transport mechanism.

11. 'Forward NSSP Update message': The AMF may send the S-NSSAI to the PHF function in the UE via the NAS transport mechanism.

12. 'Establish PDU session (S-NSSAI)': same as described for FIG. 4.

Alternatively, the initial service request as represented by step 2 may also be sent from the UE to the NFUAF in the CAS via the NAS transport mechanism.

Figure 7:
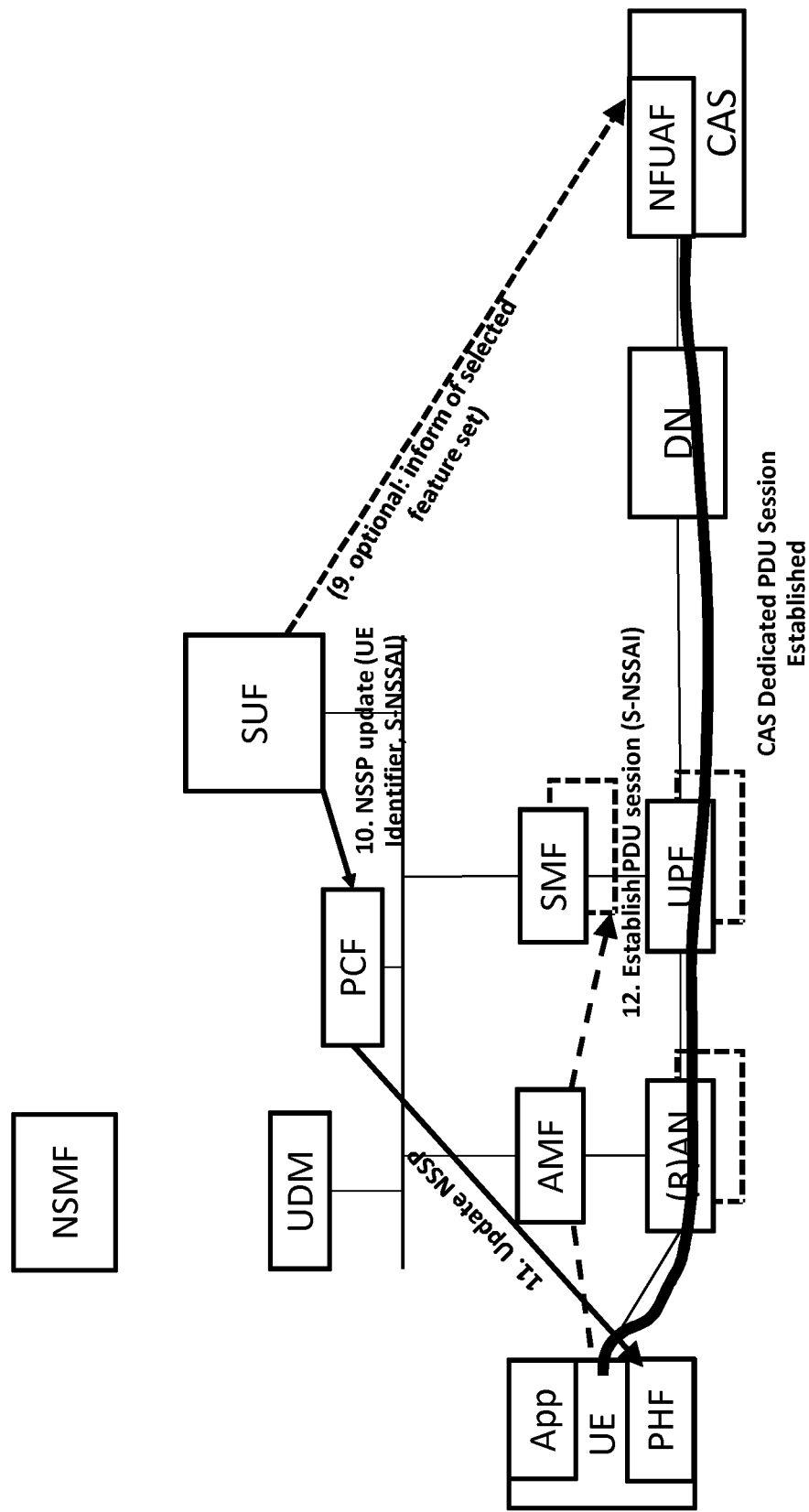
FIG. 7 shows a message exchange which may follow the message exchange of FIG. 3B and by which the slice selection is communicated to the UE via the SUF and PCF and by which the NFUAF is informed of the selected feature set.

FIG. 7 shows a message exchange which may follow the message exchange of FIG. 3B and by which the slice selection may be communicated to the UE via the SUF and PCF and the NFUAF may be informed of the selected feature set. The message exchange may be as follows (with the numbering matching FIG. 7):

9. '(optional: inform of selected feature set)': As an option, the SUF may identify the selected feature set and/or the selected network slice(s) to the CAS, e.g., to allow the CAS to retain this information for possible later use.

10. 'NSSP update (UE Identifier, S-NSSAI)': The SUF may send a request to the PCF to include the selected slice(s) in the NSSP and send an update to the UE.

11. 'Update NSSP': The PCF may update the NSSP and send the updated NSSP to the UE. The PCF may send the complete NSSP or an update to the NSSP to account for the changes. The Policy Handling Function (PHF) in the UE may process this policy update and may effect the necessary changes so that all traffic destined to the CAS passes via the particular network slice identified by the S-NSSAI.

12. 'Establish PDU session (S-NSSAI)': same as described for FIG. 4.

General

In general, the slice usage rule provided to the UE may include, or may be sent together with, QoS related information associated with the use of the network slice, such as 5G QoS Indicator (5QI) and QoS Flow Identity (QFI) information.

The UE may be involved in the handling of policies, for example in receiving a new NSSP that has resulted from the dynamic selection of a slice, or in the sending of new routing information, e.g., in the form of a slice usage rule, to the PCF for the update of the NSSP. For that purpose, the UE may comprise the PHF which may be configured to accept or reject a suggested slice selection, and update the NSSP upon receiving an update in the form of a message or information element within a message that is delivered to the UE by any of the previously described options.

In the above embodiments, the CAS may be an app store that aggregates applications from multiple providers. The CAS may also be a Content Delivery Network (CDN). The CAS may also be operated by the mobile operator itself, in which case the CAS may correspond to, e.g., an AF within the 5G core network. In this case, the influencing of the network slice usage may still have the advantageous use of allowing dynamic usage of network slices that may also be based on other routing information.

Data Processing Entities

FIG. 8 shows a system 200 which may represent a network node implementing the SUF and/or the NFUAF, or a user equipment implementing the PHF. It can be seen that the system 200 may comprise a network interface 210 for communicating with (other) network nodes in the network. The network interface 210 may take any suitable form, including but not limited to a wired network interface based on Ethernet or optical fiber or a wireless network interface. FIG. 8 further shows the system 200 comprising a storage 230, such as a hard disk, a solid-state drive, or an array thereof, which may be used by the system 200 for storing data.

The system 200 may further comprise a processor 220 which may be configured, e.g., by hardware design or software, to perform the operations described with reference to FIGS. 2-7 in as far as pertaining to the SUF and/or the NFUAF, or the PHF. For example, the processor 220 may be embodied by a single Central Processing Unit (CPU), but also by a combination or system of such CPUs and/or other types of processing units. In general, the system 200 may be embodied by a (single) device or apparatus, e.g., a network server or an end-user device. However, the system 200 may also be embodied by a distributed system of such devices or apparatuses.

In general, the SUF and/or the NFUAF, or the PHF, may be implemented at least in part by a device or apparatus. The device or apparatus may comprise one or more (micro) processors which execute appropriate software. Software implementing the functionality of the function(s) may have been downloaded and/or stored in a corresponding memory or memories, e.g., in volatile memory such as RAM or in non-volatile memory such as Flash. Alternatively, the function(s) may be implemented in the device or apparatus in the form of programmable logic, e.g., as a Field-Programmable Gate Array (FPGA). In general, each function may be implemented as a circuit.

Figure 9:
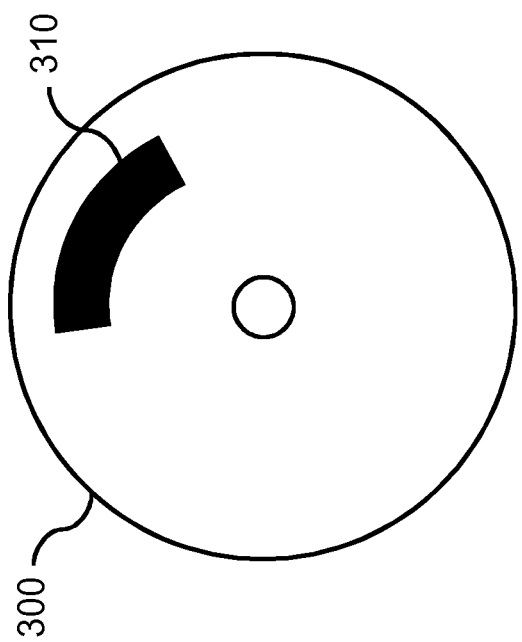
FIG. 9 shows a computer readable medium comprising non-transitory data comprising instructions for causing a processor system to perform the method.

It is noted that any of the methods described in this specification, for example in any of the claims, may be implemented on a computer as a computer implemented method, as dedicated hardware, or as a combination of both. Instructions for the computer, e.g., executable code, may be stored on a computer readable medium 300 as for example shown in FIG. 9, e.g., in the form of a series 310 of machine readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 9 shows by way of example an optical storage device 300.

Figure 10:
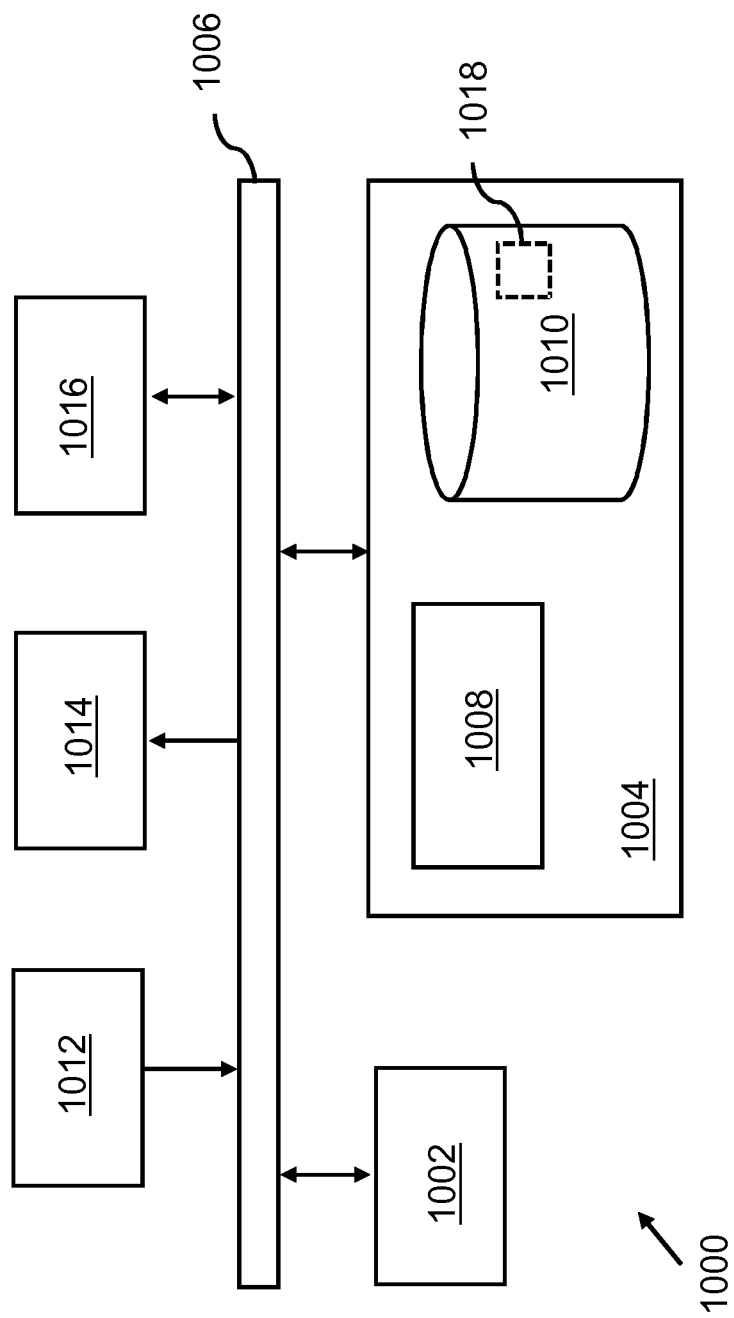
FIG. 10 shows an exemplary data processing system.

FIG. 10 is a block diagram illustrating an exemplary data processing system that may be used in the embodiments described in this specification. Such data processing systems include data processing entities described in this specification, including but not limited to data processing entities implementing functions such as but not limited to the SUF and/or the NFUAF, the PHF, the NEF, etc.

The data processing system 1000 may include at least one processor 1002 coupled to memory elements 1004 through a system bus 1006. As such, the data processing system may store program code within memory elements 1004. Further, processor 1002 may execute the program code accessed from memory elements 1004 via system bus 1006. In one aspect, data processing system may be implemented as a computer that is suitable for storing and/or executing program code. It should be appreciated, however, that data processing system 1000 may be implemented in the form of any system including a processor and memory that is capable of performing the functions described within this specification.

Memory elements 1004 may include one or more physical memory devices such as, for example, local memory 1008 and one or more bulk storage devices 1010. Local memory may refer to random access memory or other non-persistent memory device(s) generally used during actual execution of the program code. A bulk storage device may be implemented as a hard drive, solid state disk or other persistent data storage device. The processing system 1000 may also include one or more cache memories (not shown) that provide temporary storage of at least some program code in order to reduce the number of times program code must be retrieved from bulk storage device 1010 during execution.

Input/output (I/O) devices depicted as input device 1012 and output device 1014 optionally can be coupled to the data processing system. Examples of input devices may include, but are not limited to, for example, a microphone, a keyboard, a pointing device such as a mouse, a game controller, a Bluetooth controller, a VR controller, and a gesture based input device, or the like. Examples of output devices may include, but are not limited to, for example, a monitor or display, speakers, or the like. Input device and/or output device may be coupled to data processing system either directly or through intervening I/O controllers. A network adapter 1016 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1000.

As shown in FIG. 10, memory elements 1004 may store an application 1018. It should be appreciated that data processing system 1000 may further execute an operating system (not shown) that can facilitate execution of the application. The application, being implemented in the form of executable program code, can be executed by data processing system 1000, e.g., by processor 1002. Responsive to executing the application, the data processing system may be configured to perform one or more operations to be described herein in further detail.

In one aspect, for example, data processing system 1000 may implement the SUF. In that case, application 1018 may represent an application that, when executed, configures data processing system 1000 to perform the functions described herein with reference to the SUF. In another aspect, data processing system 1000 may implement the NFUAF. In that case, application 1018 may represent an application that, when executed, configures data processing system 1000 to perform the functions described herein with reference to the NFUAF. In another aspect, data processing system 1000 may implement the PHF. In that case, application 1018 may represent an application that, when executed, configures data processing system 1000 to perform the functions described herein with reference to the PHF.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A communication network comprising a plurality of network nodes and configured to enable instantiation of different network slices which represent virtual networks with different feature sets, the network comprising:
   a slice usage function (SUF) configured to assist in the creation of a slice usage rule for data communication between i) a user equipment (UE) connected to the network and configured to execute an application, and ii) a content or application server (CAS) connected to the network and configured to provide an application service via the network, by:
obtaining an identifier of the user equipment (UE),
generating feature set data identifying a feature set for every network slice which is available to the user equipment (UE) based on the identifier of the user equipment and subscription data of the user equipment;
a network feature usage assistance function (NFUAF) configured to:
obtain the feature set data,
based on the feature set data and requirements of the application service, select at least one of the feature sets, and
determine a feature set identifier identifying said selected feature set, wherein the feature set identifier enables a network slice to be identified which is associated with the selected feature set;
wherein a slice usage rule is provided to the user equipment to enable the user equipment to use said network slice for the application service.

2. The communication network according to claim 1, wherein:
the network feature usage assistance function (NFUAF) is configured to provide the feature set identifier to the slice usage function (SUF); and
the slice usage function (SUF) is configured to, based on the feature set identifier, determine a slice identifier identifying the network slice which is associated with the selected feature set.

3. The communication network according to claim 2, wherein:
the network further comprises a policy control function (PCF) configured to perform policy control for quality of service (QoS) in the network; and
the slice usage function (SUF) is configured to:
provide the slice identifier to the policy control function (PCF);
request the policy control function (PCF) to provide the slice usage rule in the form of a network slice selection policy (NSSP) or in the form of an update of the network slice selection policy to the user equipment (UE), wherein the slice usage rule contains an identifier of the network slice to be used by the application.

4. The communication network according to claim 1, wherein the network feature usage assistance function (NFUAF) is configured to generate the feature set identifier in the form of a slice identifier identifying the network slice.

5. The communication network according to claim 1, wherein the network feature usage assistance function (NFUAF) is configured to provide the slice usage rule to the user equipment (UE) in the form of a slice identifier.

6. The communication network according to claim 5, wherein:
the network feature usage assistance function (NFUAF) is implemented by the content or application server (CAS); and
the content or application server (CAS) is configured to provide the slice identifier to the user equipment (UE) via:
a user plane (UP) of the communication network;
a further network such as the Internet; or
a non-access stratum (NAS) transport mechanism.

7. The communication network according to claim 2, wherein the slice identifier is determined in the form of a single network slice selection assistance information (S-NSSAI).

8. The communication network according to claim 1, wherein:
the network further comprises a network exposure function (NEF); and
at least one of the slice usage function (SUF) and network feature usage assistance function (NFUAF) is implemented by the network exposure function.

9. A method for use with a communication network which comprises a plurality of network nodes and is configured to enable instantiation of different network slices which represent virtual networks with different feature sets,
the method assisting in the creation of a slice usage rule for data communication between i) a user equipment (UE) connected to the network and configured to execute an application, and ii) a content or application server (CAS) connected to the network and configured to provide an application service via the network, by:
obtaining an identifier of the user equipment (UE);
generating feature set data identifying a feature set for every network slice which is available to the user equipment (UE) based on the identifier of the user equipment and subscription data of the user equipment;
based on the feature set data and requirements of the application service, selecting at least one of the feature sets;
determining a slice identifier identifying a network slice which is associated with the selected feature set; and
based on the slice identifier, providing a slice usage rule to the user equipment to enable the user equipment to use said network slice for the application service.

10. A non-transitory computer-readable medium comprising a computer program, the computer program comprising instructions for causing a processor system to perform the method according to claim 9.

* * * * *

UNITED STATES PATENT AND TRADEMARK OFFICE
CERTIFICATE OF CORRECTION

PATENT NO. : 11,303,527 B2
APPLICATION NO. : 16/962208
DATED : April 12, 2022
INVENTOR(S) : Lucia D'Acunto, Pieter Nooren and Toni Dimitrovski It is certified that error appears in the above-identified patent and that said Letters Patent is hereby corrected as shown below:

On the Title Page

Item (73) Assignees, delete "Nederlandsk" and insert --Nederlandse--.

Signed and Sealed this
Thirty-first Day of May, 2022

Katherine Kelly Vidal
*Director of the United States Patent and Trademark Office*